United States Patent
Hirata et al.

(10) Patent No.: US 8,004,263 B2
(45) Date of Patent: Aug. 23, 2011

(54) SWITCHING REGULATOR

(75) Inventors: Yasushi Hirata, Osaka (JP); Yohichi Sakai, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 249 days.

(21) Appl. No.: 12/479,059

(22) Filed: Jun. 5, 2009

(65) Prior Publication Data
US 2009/0322303 A1 Dec. 31, 2009

(30) Foreign Application Priority Data

Jun. 25, 2008 (JP) .................................. 2008-165676

(51) Int. Cl.
*G05F 1/40* (2006.01)
(52) U.S. Cl. ...................................... 323/285; 323/351
(58) Field of Classification Search .................. 323/225, 323/282–290, 351
See application file for complete search history.

(56) References Cited

U.S. PATENT DOCUMENTS

| | | | | |
|---|---|---|---|---|
| 6,922,042 B2 * | 7/2005 | Umemoto et al. | ............ | 323/283 |
| 7,492,135 B2 * | 2/2009 | Saeki et al. | .................... | 323/271 |
| 7,579,817 B2 * | 8/2009 | Agari et al. | .................... | 323/282 |
| 7,605,573 B2 * | 10/2009 | Nishida | ......................... | 323/282 |
| 7,804,285 B2 * | 9/2010 | Nishida | ......................... | 323/284 |
| 7,852,055 B2 * | 12/2010 | Michishita | .................... | 323/282 |

FOREIGN PATENT DOCUMENTS

| | | |
|---|---|---|
| JP | 10-225105 | 8/1998 |
| JP | 2007-259599 | 10/2007 |

* cited by examiner

*Primary Examiner* — Jessica Han
(74) *Attorney, Agent, or Firm* — Cooper & Dunham LLP

(57) ABSTRACT

In a switching regulator, when a control switching signal received from outside is indicating PWM control, a second reference voltage generating circuit outputs, as a second reference voltage, a voltage that is lower than the minimum voltage of an output voltage range of an error amplifying circuit, so that output signals from a comparator are fixed at a high level. When a control switching signal received from outside is indicating VFM control, the second reference voltage generating circuit adjusts the second reference voltage according to the voltage difference between an input voltage and an output voltage, because the optimum second reference voltage varies according to the voltage difference between the input voltage and the output voltage.

7 Claims, 2 Drawing Sheets

US 8,004,263 B2

SWITCHING REGULATOR

BACKGROUND OF THE INVENTION

1. Field of the Invention

The present invention relates to a switching regulator capable of preventing variations in the output voltage and operating by consuming low power, under light load conditions.

2. Description of the Related Art

A conventional switching regulator performs PWM (Pulse Width Modulation) control under regular conditions, and switches to performing VFM (Variable Frequency Modulation) control under light load conditions.

With PWM control, the constant voltage output operation is performed by fixing the frame frequency and feeding back a monitored output status to adjust the time during which a switch element is turned on in accordance with the fed-back status. Meanwhile, in VFM control, the constant voltage output operation is performed by fixing the time during which the switch element is turned on, or fixing the minimum time during which the switch element is turned on, and feeding back a monitored output status to adjust the frame frequency in accordance with the fed-back status. VFM control is more advantageous than PWM control in terms of achieving high efficiency under light load conditions. This is because in PWM control, the switch element is turned on at every predetermined frequency even under light load conditions, whereas in VFM control, the number of times the switch element is turned on/off can be reduced.

For example, there is a DC-DC converter capable of operating with low power consumption under light load conditions, by controlling the timing at which the switch element is turned on, such that a division voltage obtained by dividing the output voltage becomes a predetermined reference voltage.

Patent Document 1: Japanese Laid-Open Patent Application No. H10-225105

However, the problem with such a DC-DC converter is that the timing of turning on the switch element, i.e., the timing of switching to VFM control, is determined based on an error voltage obtained by amplifying the voltage difference between the division voltage and the reference voltage, and also based on a previously specified reference voltage. Accordingly, this switching operation cannot be performed with an input signal from outside. Thus, this technology cannot be applied for operating the switching regulator with a fixed frequency. Moreover, the optimum value of the second reference voltage, which determines the timing of switching between VFM control and PWM control, may vary depending on the level of the input voltage. For this reason, it has been difficult to improve the efficiency under light load conditions and to reduce the ripple voltage, in accordance with a wide range of input voltage levels.

SUMMARY OF THE INVENTION

The present invention provides a switching regulator in which one or more of the above-described disadvantages are eliminated.

A preferred embodiment of the present invention provides a switching regulator capable of switching between PWM control and VFM control according to a signal input from outside, and reducing ripples of the output voltage in accordance with a wide range of input voltage levels when VFM control is being performed.

According to an aspect of the present invention, there is provided a switching regulator for performing PWM control or VFM control according to a control switching signal input from outside, and converting an input voltage input to an input terminal into a predetermined constant voltage and outputting the predetermined constant voltage as an output voltage from an output terminal, the switching regulator including a switch element configured to perform a switching operation so as to be turned on/off according to a control signal that has been input; an inductor configured to be charged by the input voltage according to the switching operation of the switch element; a rectification element configured to discharge the inductor in the event that the switch element is turned off and the inductor stops being charged; an error amplifying circuit unit configured to amplify a voltage difference between a predetermined first reference voltage and a proportional voltage that is proportional to the output voltage, and to output an amplified voltage corresponding to the amplified voltage difference; a slope voltage generating circuit unit configured to detect a current flowing through the switch element and generate and output a slope voltage having a slope corresponding to the detected current; and a switching control circuit unit configured to compare the slope voltage with the amplified voltage output from the error amplifying circuit unit, and control the switching operation of the switch element according to a result of such comparison, wherein the switching control circuit unit generates a second reference voltage that corresponds to a voltage difference between the input voltage and the output voltage and that changes according to the control switching signal, compares the amplified voltage output from the error amplifying circuit unit with the second reference voltage, and controls the switching operation of the switch element by performing PWM control or VFM control according to a result of such comparison.

According to one embodiment of the present invention, a switching regulator is provided, which is capable of switching between PWM control and VFM control according to a signal input from outside, and reducing ripples of the output voltage in accordance with a wide range of input voltage levels when VFM control is being performed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

Figure 1:
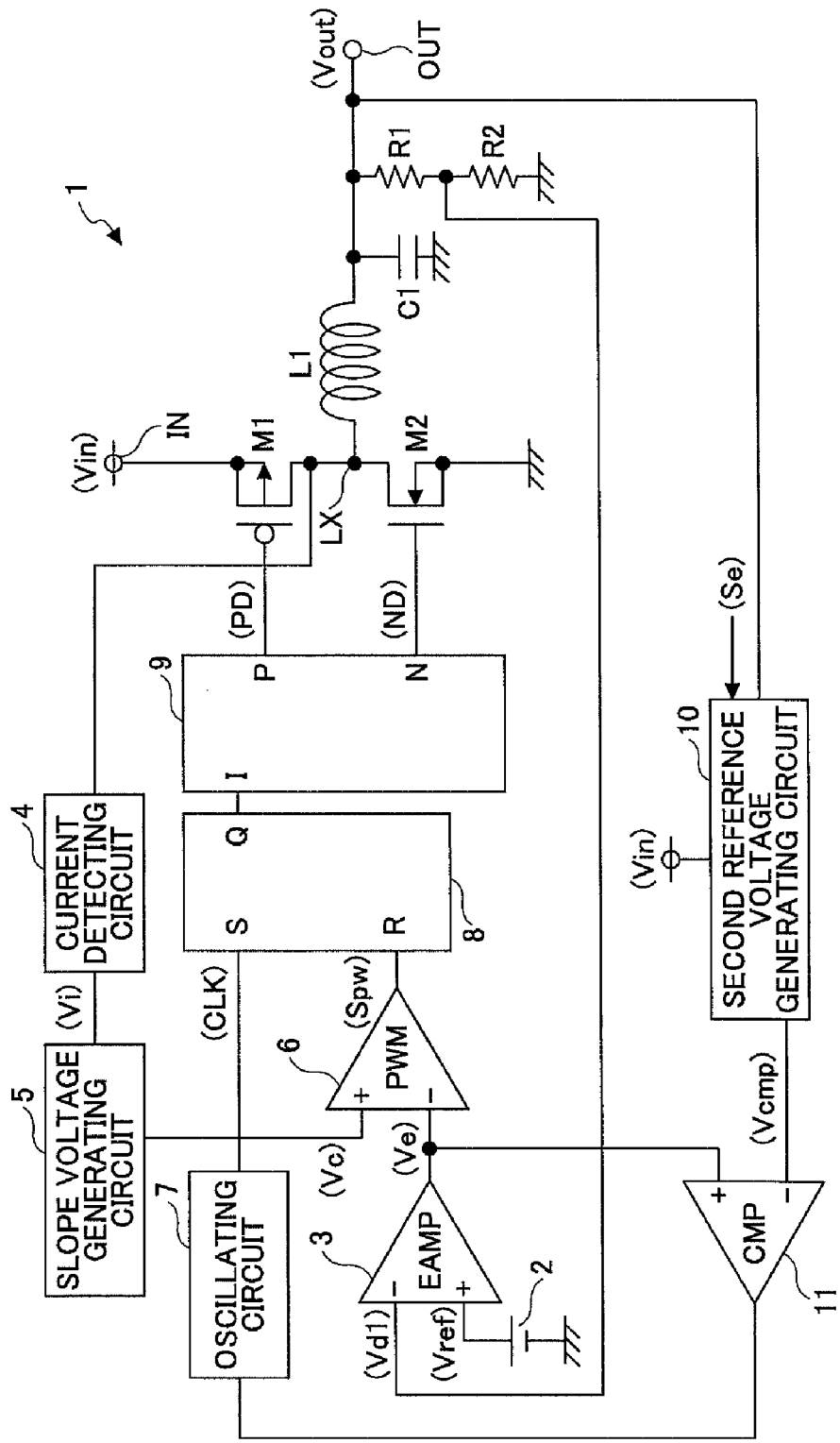
FIG. 1 illustrates a circuit example of a switching regulator according to a first embodiment of the present invention.

FIG. 1 illustrates a circuit example of a switching regulator according to a first embodiment of the present invention.

A switching regulator 1 constitutes a step-down type switching regulator, in which the current mode can be controlled, for stepping down an input voltage Vin input to an input terminal IN to a predetermined constant voltage, and outputting the voltage as an output voltage Vout from an output terminal OUT.

The switching regulator 1 includes a switching transistor M1 constituting a PMOS transistor that performs a switching operation for controlling the output of the input voltage Vin; a synchronous rectification transistor M2 constituting an NMOS transistor; an inductor L1; an output capacitor C1; and resistors R1 and R2 used for detecting the output voltage, and generating and outputting a division voltage Vd1 obtained by dividing the output voltage Vout. Furthermore, the switching regulator 1 includes a first reference voltage generating circuit 2 for generating and outputting a predetermined first reference voltage Vref; an error amplifying circuit 3 for generating and outputting an error voltage Ve obtained by amplifying the voltage difference between the division voltage Vd1 and the first reference voltage Vref; a current detecting circuit 4 for detecting a current flowing through the switching transistor M1, converting the detected current into a voltage, and outputting the voltage; and a slope voltage generating circuit 5 for generating and outputting a slope voltage Vc having a slope corresponding to the output voltage from the current detecting circuit 4.

Furthermore, the switching regulator 1 includes a PWM comparator 6 for comparing the slope voltage Vc with the error voltage Ve, and generating and outputting pulse signals Spw used for performing PWM control, whereby the pulse signals Spw have a pulse width corresponding to the error voltage Ve; an oscillating circuit 7 for generating and outputting predetermined clock signals CLK obtained in accordance with input control signals; an RS flip-flop 8 which is set by a clock signal CLK and reset by a pulse signal Spw from the PWM comparator 6; and a driver circuit 9 for generating, based on signals output from an output terminal Q of the RS flip-flop 8, control signals PD for controlling the switching operation of the switching transistor M1 and control signals ND for controlling the switching operation of the synchronous rectification transistor M2, and outputting the control signals PD and the control signals ND.

Furthermore, the switching regulator 1 includes a second reference voltage generating circuit 10 for generating and outputting a second reference voltage Vcmp that determines the timing of switching between VFM control and PWM control; and a comparator 11 for comparing the error voltage Ve and the second reference voltage Vcmp, generating a signal for controlling the timing of turning on the switching transistor M1, and outputting the generated signal to the oscillating circuit 7.

The switching transistor M1 constitutes a switch element; the synchronous rectification transistor M2 constitutes a rectification element; the first reference voltage generating circuit 2, the error amplifying circuit 3, and the resistors R1 and R2 constitute an error amplifying circuit unit; the current detecting circuit 4 and the slope voltage generating circuit 5 constitute a slope voltage generating circuit unit; and the PWM comparator 6, the RS flip-flop 8, the driver circuit 9, the second reference voltage generating circuit 10, and the comparator 11 constitute a switching control circuit unit. Furthermore, the PWM comparator 6 constitutes a first voltage comparing circuit; the RS flip-flop 8 and the driver circuit 9 constitute a control circuit; the second reference voltage generating circuit 10 and the comparator 11 constitute a control switch circuit; and the comparator 11 constitutes a second voltage comparing circuit. In the switching regulator 1, all of the circuits except for the inductor L1 and the output capacitor C1 can be integrated into a single IC. In another case, all of the circuits except for the switching transistor M1 and/or the synchronous rectification transistor M2, the inductor L1, and the output capacitor C1 can be integrated into a single IC.

The switching transistor M1 and the synchronous rectification transistor M2 are connected in series between the input terminal IN and a ground voltage. The inductor L1 is connected between a connection part LX between the switching transistor M1 and the synchronous rectification transistor M2, and the output terminal OUT. A series circuit of the resistors R1 and R2 and the output capacitor C1 are connected in parallel between the output terminal OUT and a ground voltage. The division voltage Vd1 which is the voltage at the connection part between the resistors R1 and R2, is input to the inverting input terminal of the error amplifying circuit 3, and the first reference voltage Vref is input to the noninverting input terminal of the error amplifying circuit 3.

The current detecting circuit 4 detects the current flowing through the switching transistor M1, converts the detected current into a voltage Vi, and outputs the voltage Vi to the slope voltage generating circuit 5. The slope voltage generating circuit 5 generates and outputs the slope voltage Vc having a slope corresponding to the current flowing to the switching transistor M1, whereby the slope voltage Vc is obtained by generating, for example, saw-tooth wave signals having a predetermined slope, and adding the voltage Vi (current detection voltage Vi) input from the current detecting circuit 4 to the voltage of the saw-tooth wave signals. The error voltage Ve output from the error amplifying circuit 3 is input to the inverting input terminal of the PWM comparator 6, and the slope voltage Vc is input to the noninverting input terminal of the PWM comparator 6.

The clock signals CLK are input to a set input terminal S of the RS flip-flop 8, and the pulse signals Spw output from the PWM comparator 6 are input to the reset input terminal R of the RS flip-flop 8. The driver circuit 9 generates the control signals PD and the control signals ND based on the signals output from the output terminal Q of the RS flip-flop 8, and outputs the control signals PD and the control signals ND to gates of the switching transistor M1 and the synchronous rectification transistor M2, respectively. The second reference voltage generating circuit 10 receives the output voltage Vout, and control switching signals Se from outside. The second reference voltage generating circuit 10 generates the second reference voltage Vcmp based on the output voltage Vout, and changes the voltage value of the second reference voltage Vcmp according to the control switching signals Se. The error voltage Ve is input to the noninverting input terminal of the comparator 11, and the second reference voltage Vcmp is input to the inverting input terminal of the comparator 11. Output signals from the comparator 11 are output to the oscillating circuit 7. The oscillating circuit 7 generates and outputs predetermined clock signals CLK obtained in accordance with the signals received from the comparator 11.

In such a configuration, the control switching signal Se is for instructing the switching regulator 1 to switch between PWM control and VFM control. When the input control switching signal Se is instructing to perform PWM control, the second reference voltage generating circuit 10 outputs, as the second reference voltage Vcmp, a voltage lower than the minimum voltage in the output voltage range of the error amplifying circuit 3. Accordingly, the output signals from the comparator 11 are fixed at a high level. Conversely, when the input control switching signal Se is instructing to perform VFM control, the second reference voltage generating circuit 10 adjusts the second reference voltage Vcmp according to the voltage difference between the input voltage Vin and the output voltage Vout, because the optimum second reference voltage Vcmp varies according to the voltage difference between the input voltage Vin and the output voltage Vout.

First, a description is given of a case where the control switching signal Se is instructing to perform PWM control.

In this case, high-level signals are output from the comparator 11, and while high-level signals are being output from the comparator 11, the oscillating circuit 7 generates and outputs predetermined clock signals CLK. Conversely, while low-level signals are being output from the comparator 11, the oscillating circuit 7 stops operating and stops outputting the clock signals CLK, so that the set input terminal S of the RS flip-flop 8 becomes low-level.

The error amplifying circuit 3 generates and outputs the error voltage Ve obtained by amplifying the difference between the input division voltage Vd1 and the first reference voltage Vref. The PWM comparator 6 compares the error voltage Ve with the slope voltage Vc, generates a pulse signal Spw indicating the comparison result, and outputs a pulse signal Spw to the reset input terminal R of the RS flip-flop 8. The PWM comparator 6 outputs a low-level signal in the event that the slope voltage Vc is less than or equal to the error voltage Ve. In this case, when a high-level clock signal CLK is input to the RS flip-flop 8, the output terminal Q of the RS flip-flop 8 is set to be high-level.

When high-level signals are output from the output terminal Q of the RS flip-flop 8, the driver circuit 9 outputs low-level control signals PD and low-level control signals ND to the switching transistor M1 and the synchronous rectification transistor M2, respectively. Accordingly, the switching transistor M1 is turned on and is switched to a conductive status, and the synchronous rectification transistor M2 is turned off and is switched to a cutoff status. Thus, the input voltage Vin is applied to the series circuit configured by the inductor L1 and the output capacitor C1. The current output from the switching transistor M1 linearly increases with the passage of time. The current detection voltage Vi output from the current detecting circuit 4 also linearly rises. When an inductor current iL flowing to the inductor L1 exceeds the output voltage Vout output from the output terminal OUT, charges are accumulated in the output capacitor C1 and the output voltage Vout rises.

When low-level signals are output from the output terminal Q of the RS flip-flop 8, the driver circuit 9 outputs high-level control signals PD and high-level control signals ND to the gates of the switching transistor M1 and the synchronous rectification transistor M2, respectively. Accordingly, the switching transistor M1 is turned off and is switched to a cutoff status, and the synchronous rectification transistor M2 is turned on and is switched to a conductive status. As a result, the energy accumulated in the inductor L1 is discharged, and consequently the inductor current iL linearly decreases with the passage of time. When an inductor current iL drops below the output voltage Vout, power is supplied from the output capacitor C1, and the output voltage Vout declines.

When the slope voltage Vc exceeds the error voltage Ve, the PWM comparator 6 outputs high-level pulse signals Spw to reset the RS flip-flop 8. While high-level pulse signals Spw are being received, the output terminal Q of the RS flip-flop 8 is set to a low level regardless of the signal level of the clock signals CLK, and the same operation as described above is performed so that the output voltage Vout declines.

When the output voltage Vout declines, the error voltage Ve from the error amplifying circuit 3 rises. Therefore, more time is required for the slope voltage Vc to exceed the error voltage Ve, and the switching transistor M1 is turned on for a longer period of time, and consequently the output voltage Vout rises. Conversely, when the output voltage Vout rises, the switching transistor M1 is turned on for a shorter period of time, and consequently the output voltage Vout declines. In this manner, the time lengths of turning on/off the switching transistor M1 and the synchronous rectification transistor M2 are controlled in a complementary manner according to the variation in the output voltage Vout, and therefore the output voltage Vout is stabilized at a predetermined level.

Next, a description is given of a case where the control switching signal Se is instructing to perform VFM control.

In this case, when the output voltage Vout from the switching regulator 1 rises, and the error voltage Ve from the error amplifying circuit 3 becomes less than or equal to the second reference voltage Vcmp, the comparator 11 outputs low-level signals, and the oscillating circuit 7 stops outputting clock signals CLK such that high-level set signals are not input to the set input terminal S of the RS flip-flop 8. Accordingly, the switching operation for the switching transistor M1 is not performed.

Subsequently, when the output voltage Vout from the switching regulator 1 declines, and the error voltage Ve from the error amplifying circuit 3 exceeds the second reference voltage Vcmp, the comparator 11 outputs high-level signals, the oscillating circuit 7 outputs clock signals CLK, and the switching transistor M1 is turned on/off according to the signal level of the clock signals CLK.

When the voltage difference between the input voltage Vin and the output voltage Vout is small, the operating point of the error voltage Ve from the error amplifying circuit 3 rises. Then, the second reference voltage generating circuit 10 raises the second reference voltage Vcmp so that VFM control can be performed in a stable manner. Conversely, when the voltage difference between the input voltage Vin and the output voltage Vout is large, the operating point of the error voltage Ve from the error amplifying circuit 3 declines. Then, the second reference voltage generating circuit 10 lowers the second reference voltage Vcmp, because if the second reference voltage Vcmp is high, the ripple voltage of the output voltage Vout increases. In this manner, when the control switching signal Se is instructing to perform VFM control, the second reference voltage generating circuit 10 changes the voltage value of the second reference voltage Vcmp according to the voltage difference between the input voltage Vin and the output voltage Vout.

As described above, the switching regulator 1 can switch between VFM control and PWM control by changing the voltage value of the second reference voltage Vcmp according to the control switching signals Se received from outside. During VFM control, the voltage value of the second reference voltage Vcmp is adjusted according to the voltage difference between the voltages of the input terminal IN and the output terminal OUT. Accordingly, the ripple voltage of the output voltage Vout can be reduced in accordance with a wide range of input voltage levels.

Figure 2:
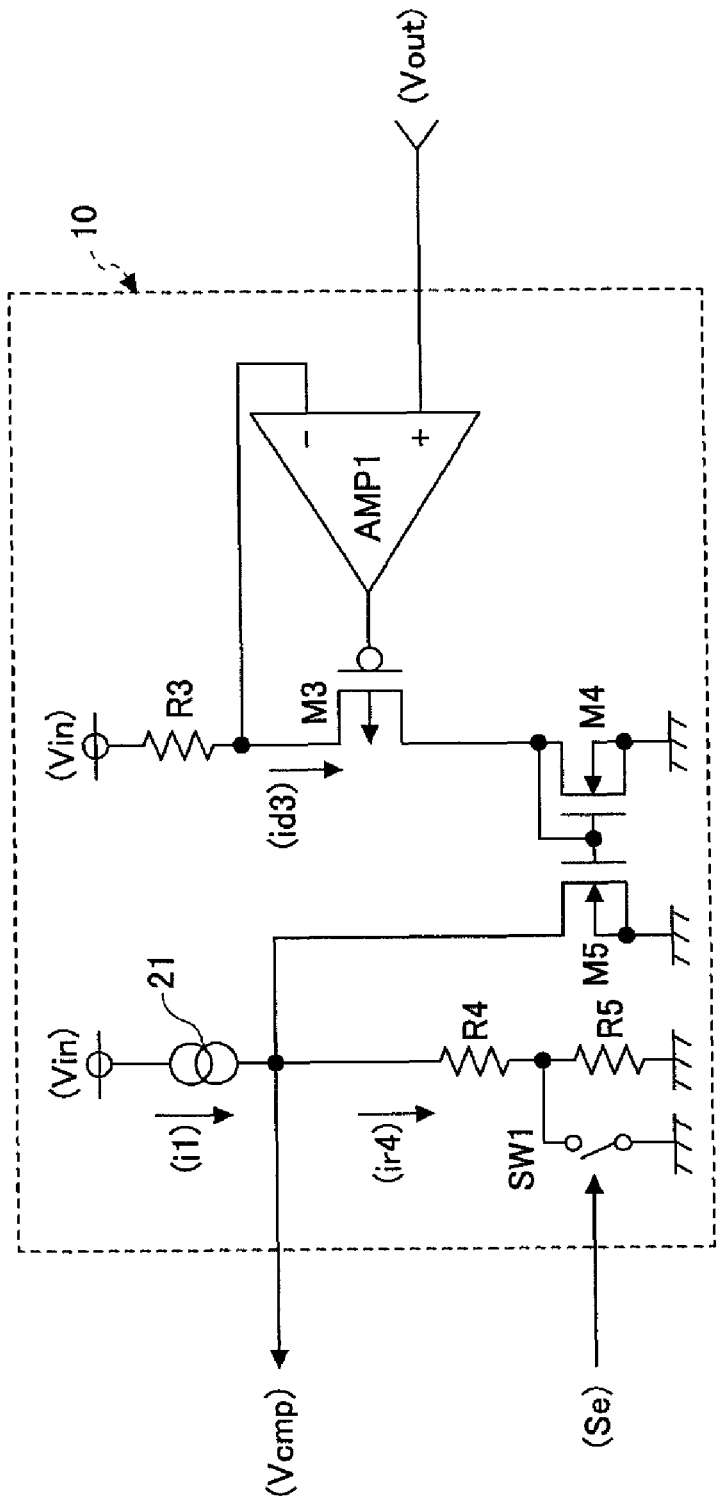
FIG. 2 illustrates a circuit example of a second reference voltage generating circuit shown in FIG. 1.

FIG. 2 illustrates a circuit example of the second reference voltage generating circuit 10 shown in FIG. 1. Further details of the operations of the second reference voltage generating circuit 10 are described with reference to FIG. 2.

As shown in FIG. 2, the second reference voltage generating circuit 10 includes an operational amplifying circuit AMP1, a PMOS transistor M3, NMOS transistors M4 and M5 constituting a current mirror circuit, resistors R3 through R5, a switch SW1, and a constant current source 21. The operational amplifying circuit AMP1, the PMOS transistor M3, the NMOS transistors M4 and M5, and the resistor R3 constitute a proportional current generating circuit; and the resistors R4 and R5 and the switch SW1 constitute a current-voltage conversion circuit.

The output voltage Vout is input to the noninverting input terminal of the operational amplifying circuit AMP1; the inverting input terminal of the operational amplifying circuit AMP1 is connected to the source of the PMOS transistor M3; and the output terminal of the operational amplifying circuit AMP1 is connected to the gate of the PMOS transistor M3. The source of the PMOS transistor M3 is connected to the input voltage Vin through the resistor R3; and the drain of the PMOS transistor M3 is connected to the drain of the NMOS transistor M4. The gates of the NMOS transistors M4 and M5 are connected to each other, and this connection part is connected to the drain of the NMOS transistor M4. The sources of the NMOS transistors M4 and M5 are connected to ground voltages. The constant current source 21, and the resistors R4 and R5 are connected in series between the input voltage Vin and ground voltage. The switch SW1 is connected in series with the resistor R5. The switch SW1 performs a switching operation according to input control switching signals Se. The connection part of the constant current source 21 and the resistor R4 is connected to the drain of the NMOS transistor M5, thereby constituting the output terminal of the second reference voltage generating circuit 10. The second reference voltage Vcmp is output from the connection part of the constant current source 21 and the resistor R4.

The operational amplifying circuit AMP1 controls the gate voltage of the PMOS transistor M3 so that the source voltage of the PMOS transistor M3 becomes the same as the output voltage Vout. Accordingly, a voltage corresponding to the difference between the input voltage Vin and the output voltage Vout is applied to the resistor R3. Consequently, a drain current id3 of the FMOS transistor M3 becomes proportional to the voltage difference between the input voltage Vin and the output voltage Vout. The drain current id3 is caused to be in a reverse direction by a current mirror circuit formed by the NMOS transistors M4 and M5. By configuring the NMOS transistors M4 and M5 to have the same size, the same current as the drain current id3 will flow to the NMOS transistor M5.

The drain of the NMOS transistor M5 is connected to the constant current source 21, and therefore a drain current ir4 that flows to the resistor R4 is expressed by the following formula (1), where i1 corresponds to the current output from the constant current source 21.

$$ir4 = i1 - id3 \quad (1)$$

When the switch SW1 is turned on and switched to a conductive status, the second reference voltage Vcmp is expressed by the following formula (2). Hereinafter, r4 and r5 correspond to the resistances of the resistors R4 and R5, respectively.

$$Vcmp = ir4 \times r4 \quad (2)$$

Furthermore, when the switch SW1 is turned off and switched to a cutoff status, the second reference voltage Vcmp is expressed by the following formula (3).

$$Vcmp = ir4 \times (r4+r5) = (i1-id3) \times (r4+r5) \quad (3)$$

When a control switching signal Se indicating PWM control is input, the switch SW1 is turned on and switched to a conductive status. When a control switching signal Se indicating VFM control is input, the switch SW1 is turned off and switched to a cutoff status. Thus, when PWM control is performed, the resistance of the resistor R4 and a current i1 output from the constant current source 21 are specified such that second reference voltage Vcmp becomes lower than the minimum voltage of the voltage range of the error voltage Ve from the error amplifying circuit 3. When VFM control is performed, the drain current id3 of the PMOS transistor M3 increases proportionally to the voltage difference between the input voltage Vin and the output voltage Vout. Accordingly, the second reference voltage Vcmp is corrected according to the voltage difference between the input voltage Vin and the output voltage Vout.

As described above, the switching regulator according to the first embodiment of the present invention is capable of switching between VFM control and PWM control by changing the second reference voltage Vcmp according to the control switching signals Se input from outside; correcting the second reference voltage Vcmp according to the voltage difference between the input voltage Vin and the output voltage Vout during VFM control; and reducing ripples of the output voltage in accordance with a wide range of input voltage levels during VFM control.

In the above description, a step-down type switching regulator employing a synchronous rectification method is taken as an example. However, the present invention is not so limited. The present invention is also applicable to a step-down type switching regulator employing an asynchronous rectification method, a step-up type switching regulator, and an inverting type switching regulator.

An embodiment of the present invention is applicable to an information terminal that operates with a battery, such as a mobile phone and a PDA (Personal Digital Assistant).

The present invention is not limited to the specifically disclosed embodiment, and variations and modifications may be made without departing from the scope of the present invention.

The present application is based on Japanese Priority Patent Application No. 2008-165676, filed on Jun. 25, 2008, the entire contents of which are hereby incorporated herein by reference.

What is claimed is:

1. A switching regulator for performing PWM control or VFM control according to a control switching signal input from outside, and converting an input voltage input to an input terminal into a predetermined constant voltage and outputting the predetermined constant voltage as an output voltage from an output terminal, the switching regulator comprising:

a switch element configured to perform a switching operation so as to be turned on/off according to a control signal that has been input;

an inductor configured to be charged by the input voltage according to the switching operation of the switch element;

a rectification element configured to discharge the inductor in the event that the switch element is turned off and the inductor stops being charged;

an error amplifying circuit unit configured to amplify a voltage difference between a predetermined first reference voltage and a proportional voltage that is proportional to the output voltage, and to output an amplified voltage corresponding to the amplified voltage difference;

a slope voltage generating circuit unit configured to detect a current flowing through the switch element and generate and output a slope voltage having a slope corresponding to the detected current; and a switching control circuit unit configured to compare the slope voltage with the amplified voltage output from the error amplifying circuit unit, and control the switching operation of the switch element according to a result of the comparison, wherein:

the switching control circuit unit generates a second reference voltage that corresponds to a voltage difference between the input voltage and the output voltage and that changes according to the control switching signal, compares the amplified voltage output from the error amplifying circuit unit with the second reference voltage, and controls the switching operation of the switch element by performing PWM control or VFM control according to a result of the comparison.

2. The switching regulator according to claim 1, wherein:
in the event that the amplified voltage output from the error amplifying circuit unit is higher than the second reference voltage, the switching control circuit unit controls the switching operation of the switch element by performing PWM control; and
in the event that the amplified voltage output from the error amplifying circuit unit is lower than or equal to the second reference voltage, the switching control circuit unit controls the switching operation of the switch element by performing VFM control.

3. The switching regulator according to claim 2, wherein:
in the event that the control switching signal that has been input is indicating PWM control, the switching control circuit unit generates the second reference voltage that is lower than a minimum amplified voltage in a range of the amplified voltages output from the error amplifying circuit unit.

4. The switching regulator according to claim 1, wherein the switching control circuit unit comprises:
a first voltage comparing circuit configured to compare the slope voltage with the amplified voltage output from the error amplifying circuit unit, generate a pulse signal of a duty cycle corresponding to a result of the comparison, and output the pulse signal;
a control switch circuit configured to generate the second reference voltage corresponding to the control switching signal, compare the second reference voltage with the amplified voltage output from the error amplifying circuit unit, generate a switch instruction signal indicating an instruction to perform PWM control or VFM control according to a result of the comparison, and output the switch instruction signal;
an oscillating circuit configured to generate a clock signal having a predetermined pulse width according to the switch instruction signal output from the control switch circuit, and output the clock signal; and
a control circuit configured to receive the clock signal from the oscillating circuit for turning on the switch element and to receive the pulse signal from the first voltage comparing circuit for turning off the switch element, and to control the switching operation of the switch element according to the clock signal and the pulse signal, wherein:
the oscillating circuit stops outputting the clock signal while the control switch circuit is outputting the switch instruction signal indicating the instruction to perform VFM control.

5. The switching regulator according to claim 4, wherein the control switch circuit comprises:
a second reference voltage generating circuit configured to generate the second reference voltage corresponding to the control switching signal that has been input, and output the second reference voltage; and
a second voltage comparing circuit configured to compare the second reference voltage with the amplified voltage output from the error amplifying circuit unit, generate the switch instruction signal according to a result of the comparison, and output the switch instruction signal to the oscillating circuit, wherein:
in the event that the control switching signal is indicating VFM control, the second reference voltage generating circuit generates the second reference voltage corresponding to the voltage difference between the input voltage and the output voltage, and outputs the second reference voltage thus generated; and
in the event that the control switching signal is indicating PWM control, the second reference voltage generating circuit generates the second reference voltage that is lower than a minimum amplified voltage in a range of the amplified voltages output from the error amplifying circuit unit, and outputs the second reference voltage thus generated.

6. The switching regulator according to claim 5, wherein the second reference voltage generating circuit comprises:
a constant current source configured to generate and output a predetermined constant current;
a proportional current generating circuit configured to generate a proportional current that is proportional to the voltage difference between the input voltage and the output voltage; and
a current-voltage conversion circuit configured to convert a current, which is obtained by subtracting the proportional current from the constant current, into a voltage, and outputting the voltage thus obtained as the second reference voltage, wherein:
in the event that the control switching signal that has been input is indicating PWM control, the current-voltage conversion circuit generates the second reference voltage that is lower than the minimum amplified voltage in the range of the amplified voltages output from the error amplifying circuit unit.

7. The switching regulator according to claim 6, wherein the current-voltage conversion circuit comprises:
a resistor circuit configured to convert the current, which is obtained by subtracting the proportional current from the constant current, into the voltage, wherein:
the resistor circuit changes a resistance value according to the control switching signal that has been input.

* * * * *